US011425219B1

(12) United States Patent
Lee et al.

(10) Patent No.: US 11,425,219 B1
(45) Date of Patent: Aug. 23, 2022

(54) SMART STREAM CAPTURE

(71) Applicant: Twitch Interactive, Inc., San Francisco, CA (US)

(72) Inventors: Sang Jin Lee, San Francisco, CA (US); Maxime Boulin, Redwood City, CA (US); Jackson Gardner, Oakland, CA (US); Phillip Carter, Lake Forest, CA (US); Charles Bradford, Irvine, CA (US); Ross Alan Cameron Gardner, Irvine, CA (US); Tyler McDowall, Laguna Hills, CA (US); RayAna Min Stanek, Irvine, CA (US); Kevin M. Ni, San Francisco, CA (US)

(73) Assignee: Twitch Interactive, Inc., San Francisco, CA (US)

( * ) Notice: Subject to any disclaimer, the term of this patent is extended or adjusted under 35 U.S.C. 154(b) by 0 days.

(21) Appl. No.: 16/587,524

(22) Filed: Sep. 30, 2019

(51) Int. Cl.
| | |
|---|---|
| *H04L 67/75* | (2022.01) |
| *H04L 65/61* | (2022.01) |
| *H04L 65/1083* | (2022.01) |
| *H04L 65/1059* | (2022.01) |
| *H04L 67/131* | (2022.01) |

(52) U.S. Cl.
CPC .......... *H04L 67/36* (2013.01); *H04L 65/1059* (2013.01); *H04L 65/1083* (2013.01); *H04L 65/4069* (2013.01); *H04L 67/38* (2013.01)

(58) Field of Classification Search
CPC ..... H04L 67/36; H04L 67/38; H04L 65/1059; H04L 65/1083; H04L 65/4069
See application file for complete search history.

(56) References Cited

U.S. PATENT DOCUMENTS

| 6,044,408 | A  | * | 3/2000  | Engstrom ............. G06F 13/105 |
|           |    |   |         | 719/328                           |
| 9,456,148 | B1 | * | 9/2016  | Khem .................. H04N 5/2258 |
| 11,076,111| B1 | * | 7/2021  | Ni ............................. G06T 7/90 |
| 2008/0309778 | A1 | * | 12/2008 | Tabatabai ............. H04N 5/2628 |
|           |    |   |         | 348/222.1                         |
| 2009/0213935 | A1 | * | 8/2009  | van der Laan ....... A63F 13/335 |
|           |    |   |         | 375/240.16                        |
| 2010/0009747 | A1 | * | 1/2010  | Reville .................... A63F 13/79 |
|           |    |   |         | 463/31                            |
| 2016/0228776 | A1 | * | 8/2016  | Miura ..................... A63F 13/86 |
| 2017/0006074 | A1 | * | 1/2017  | Oates, III ............. H04N 21/472 |
| 2017/0151496 | A1 | * | 6/2017  | Heinz, II ................. D06B 1/00 |
| 2021/0185277 | A1 | * | 6/2021  | McDevitt ........... H04N 21/4788 |

\* cited by examiner

*Primary Examiner* — June Sison
(74) *Attorney, Agent, or Firm* — BakerHostetler

(57) ABSTRACT

A plurality of image sources that are open on a first computing device may be determined. A plurality of visual representations of the plurality of image sources may be displayed. A selection of a first image source of the plurality of image sources for which to transmit first image data corresponding to the first image source to one or more other computing devices may be received via the plurality of visual representations. A first image capture component to capture the first image data may be automatically selected, by one or more software components, from a plurality of image capture components. The first image data may be captured using the first image capture component, and the first image data may be transmitted to the one or more other computing devices.

15 Claims, 8 Drawing Sheets

Selection Criteria 305

| Image Source Criteria 501 | Prior Use Criteria 502 | Trial and Error Criteria 503 |
|---|---|---|
| • Image source type (e.g., video game, webcam, capture card, other application, etc.)<br>• Graphics card assisted?<br>• API type and version<br>• Other | • Testing (e.g., by video streaming service)<br>• Prior use by same streamer<br>• Prior use by other streamers<br>• Other | • Attempt use of one or more image capture components until successful<br>• Use desktop capture as fallback |

FIG. 5

SMART STREAM CAPTURE

BACKGROUND

The widespread use of video streaming has increased rapidly in recent years. A streamer, as used herein, refers to a user that provides video content that is streamed to viewers. In some examples, a streamer may capture video content and transmit the video content to a video streaming service. The video streaming service may then, in turn, transmit the video to a number of viewers. In one specific example, a streamer may be a video game player that captures and transmits video of a game that he or she is playing. In addition or as alternative to video games, a streamer may also transmit video from other image sources, such as other applications, cameras (e.g., webcams), capture cards, and the like. Various image capture components, such as plugin components, may be used to capture image data from an image source on a streamer's computer for transmission to other remote devices. Different types of image sources, however, may require different types of image capture components. For example, certain video games that are highly graphics-intensive may require different types of image capture components than other applications that are less graphics-intensive. As another example, some video games may often require different types of image capture components than other video games, such as due to particular types and/or versions of graphics application programming interfaces (API's) that are employed by the different video games. As yet other examples, different types of image capture components may be required for use with webcams, capture cards or for capturing images of an entire desktop. In some examples, the use of an improper image capture component may result in a failure to capture and transmit video or other image data from a streamer.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 5 is a diagram illustrating example image capture component selection criteria that may be used in accordance with the present disclosure.

DETAILED DESCRIPTION

Figure 1:
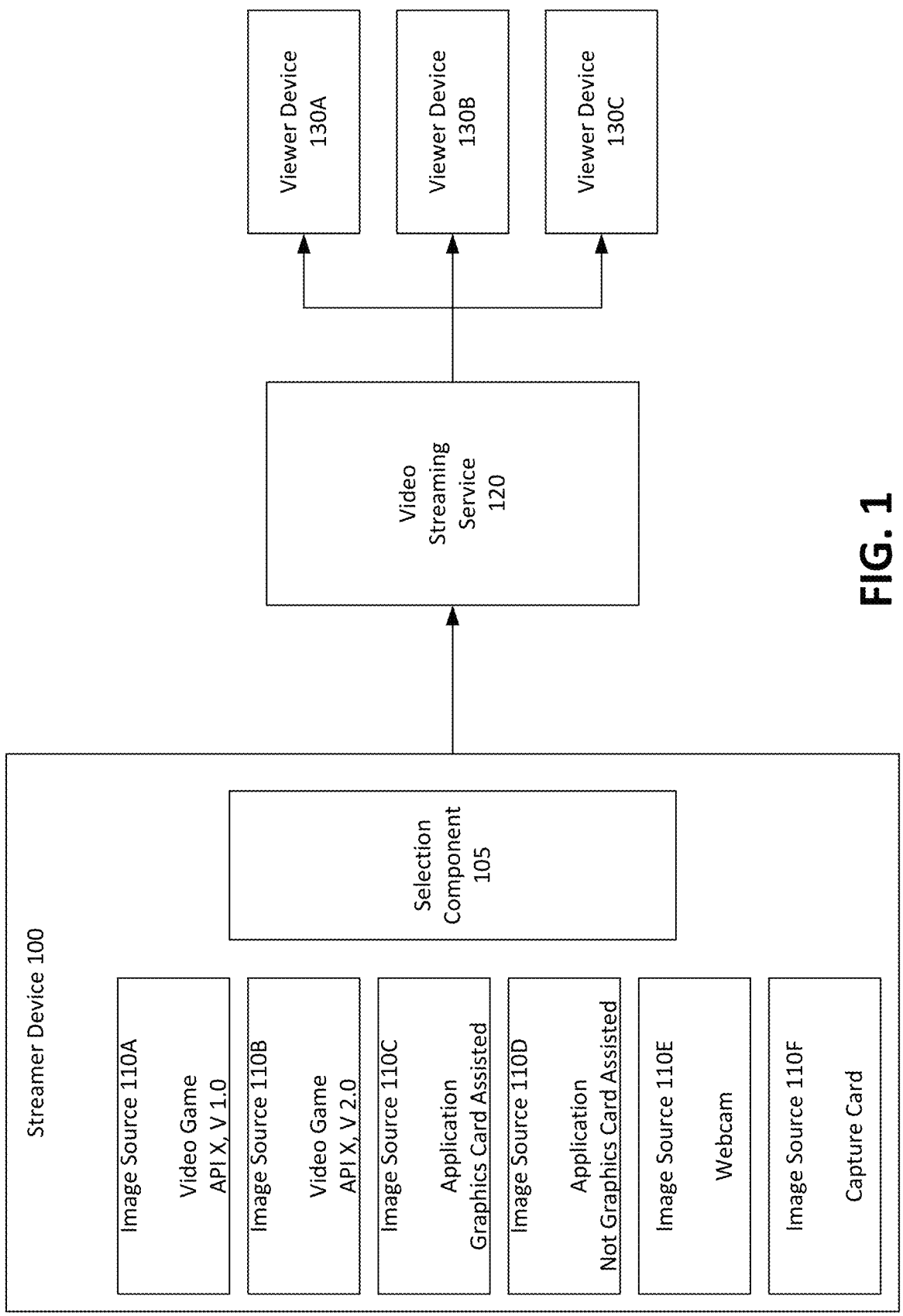
FIG. 1 is a diagram illustrating an example smart stream capture system that may be used in accordance with the present disclosure.

Techniques for smart stream capture are described herein. In particular, in some examples, a selection component, such as a software component executing on the streamer's device, may perform various operations related to initiation of a streaming session on the streamer's device. As described in greater detail below, the selection component may, in some examples, determine open image sources on the streamer's device, receive an indication of a selected image source for streaming to other devices, automatically select a suitable image capture component for use with the selected image source, and employ the selected image capture component to capture image data from the selected image source for streaming to other devices.

A streamer may indicate to the selection component that the streamer wishes to initiate a streaming session. In response, the selection component may determine which image sources are currently open on the streamer's device. The term image source, as used herein, refers to an application or other component that provides image data that may be displayed to users. Some example image sources may include video games, other applications, cameras (e.g., webcams), capture cards, and the like. In some cases, the selection component may request an indication of open applications on the streamer's device from an operating system executing on the streamer's device. The selection component may then determine the open image sources based on the open applications. For example, the open image sources may include open applications that generate image data. Upon determining the open image sources, the selection component may display an interface that includes selectable representations of the open image sources. In some examples, the selectable representations may include thumbnails, titles, icons, and/or other indications of the open image sources. In some examples, the use of thumbnails as selectable representations may be advantageous because they may provide an additional visual confirmation to the streamer of the contents of each open image source. The streamer may then select a particular image source for streaming, such as by selecting the respective selectable representation corresponding to the desired image source.

Upon receipt of a selected image source for streaming, the selection component may automatically select a suitable image capture component for use with the selected image source. The term image capture component, as used herein, refers to a component that is used to extract image data from an application or other source and provide the image data for transmission. Some common examples of image capture components may include game capture components, window capture components, and desktop capture components. Game capture components may be employed with video games (or, in some cases, other applications) that use a hardware-accelerated low-level rendering graphics application programming interface (API) such as DIRECTX®, OPENGL®, VULKAN®, and the like. After a game engine has done its work to draw the contents of a frame, it may employ an entry-point in a graphics API to present what it has drawn to a screen of a local device. In some example approaches, a game capture component may cause a presentation entry-point in a graphics API to be replaced with a replacement function. The replacement function may copy out the contents of that frame into buffers that may be used when compositing the video to send to the transmission stream. After that data is copied out, the true presentation entry-point may be called to actually present the data to the screen of the streamer's local device. In some examples, game capture components may be preferred over other types of capture components, because they may allow for better performance. By contrast, window capture components may operate by directly accessing the contents of a window buffer. For example, some operating systems may provide an API that directly allows access to the contents of a window buffer. While window capture techniques may be simpler, they are usually not as performant as game capture, and they may not always be available with all applications. Additionally, desktop capture components may operate by accessing the contents of an entire screen. For example, some operating systems may also provide an API that allows accessing the contents of the entire screen. In some of these cases, the contents of the screen may be cropped to show only a selected image source, provided that the image source is in the foreground and not occluded by any other windows. Desktop capture may often be the least preferred method, for example due to the fact that the selected image source may be occluded.

In some examples, the selection component may employ a variety of selection criteria in order to automatically select a suitable image capture component for use with the selected image source. For example, in some cases, the selection component may access stored information that indicates a selected image capture component for use with the selected image source. In some examples, this stored information may be compiled, maintained, updated, and provided to the selection component by a video streaming service that the streamer employs to transmit the streamed image data to viewers. In some examples, the selected image capture component may be determined based, at least in part, on characteristics of the selected image source. For example, the selected image capture component may be determined based, at least in part, on whether the selected image source is generated by a video game, a webcam, a capture card, or by another type of application. The selected image capture component may be also be determined based on other factors, such as a particular type and/or version of graphics API's that are employed by the selected image source (e.g., DIRECTX®, OPENGL®, VULKAN®, and/or other graphics API's). The selected image capture component may also be determined based on other characteristics, such as whether the selected image source is assisted by a graphics card and/or other factors.

In some examples, the selected image capture component may be determined based on prior-use data regarding one or more prior uses of the selected image capture component (and/or other image capture components) to capture image data from the selected image source. For example, in some cases, a video streaming service may conduct tests to determine which image capture components are most suitable for use with a particular image source. Also, in some cases, the video streaming service may monitor prior attempts by the streamer to capture image data from the selected image source. If a prior attempt is successful, then the video streaming service may store, in the prior-use data, an indication of the image capture component that was used in the successful attempt. In addition to prior image capture attempts by the same streamer, the video streaming service may also crowdsource its data, such as by monitoring prior image capture attempts made by other streamers to indicate which image capture components resulted in successful attempts. It will be appreciated that any crowdsourcing of data would be accomplished after appropriate permissions have been given by the individual users of the crowd being sourced. In some examples, the video streaming service may employ various factors to determine whether a prior image capture attempt is successful. In particular, in some cases, an image capture attempt may be considered to be successful when a streamer initiates and operates a streaming session for at least a minimum threshold time duration. By contrast, if, after a short time duration (e.g., less than the minimum threshold time duration), the streamer terminates a streaming session with an initial image capture component and re-attempts streaming using a different type of image capture component, then this may be an indication that the initial image capture component was not successful or suitable for streaming of image data from that application.

In some examples, the selection component may employ a trial and error process to select an image capture component that is suitable for use with the selected image source. For example, in some cases, the selection component may attempt the use of an initial image capture component to capture image data from the selected image source. The selection component may then make a determination as to whether this initial attempt is successful. In some examples, a texture of an image that is captured using the initial image capture component may be examined to determine whether the initial attempt is successful. Specifically, in some cases, if the captured image has no texture or an all-black texture, then this may indicate that the initial image capture component does not successfully capture the image data. By contrast, if the captured image has a valid texture that is not all black, then this may indicate that the initial image capture component successfully captures the image data and is suitable for use with the selected image source. If the initial image capture component is unsuitable (i.e., does not successfully capture the image data), then the selection component may re-attempt the image capture with one or more different successive image capture components until a suitable image capture component that successfully captures the image data is detected. In some examples, if no suitable image capture component is identified for the selected image source (or if a threshold number of allowed attempts is exceeded), then, as a fallback, a desktop capture component may be employed to capture an image of the entire desktop of the streamer's device. The image of the entire desktop may then be cropped to include only the selected image source that the streamer wishes to capture and transmit.

Thus, the smart stream capture techniques described herein may provide a number of advantages. For example, by displaying selectable thumbnails or other representations of open image sources, the described techniques may allow streamers to easily view and select open image sources for streaming. Additionally, by automatically selecting a suitable image capture component for a selected image source, the described techniques may improve efficiency and reliability. Specifically, when forced to manually select an image capture component, certain streamers may be unaware of the particular image capture requirements of a selected image source. For example, while many video games may require game capture components, there are some video games that may require window capture components. Additionally, while many non-gaming applications may require window capture components, there are some non-gaming applications that may require game capture components. As another example, a streamer may be unaware of a particular type or version of a graphics API used by a game or application, and/or whether an application is assisted by a graphics card. Thus, in some cases, when manually selecting an image capture component, streamers may have to attempt several different image capture components in order to find one that works—if they are able to find one at all. Streamers may also have to invest considerable time and effort to figure why an attempted image capture method didn't work. The described techniques may reduce this complexity and confusion and eliminate the need for manually attempting multiple different capture components. Moreover, the described techniques may allow streamers to benefit from prior testing of image capture components and/or prior knowledge of successful uses of image capture components from the same or other streamers.

Referring now to FIG. 1, an example smart stream capture system will now be described in detail. As shown, a streamer device 100 includes a number of image sources 110A-F. In particular, in the example of FIG. 1, image source 110A is a video game that employs a particular graphics API (i.e., API X, Version 1.0), image source 110B is another video game that employs another particular graphics API (i.e., API X, Version 2.0), image source 110C is an application that is graphics card assisted, image source 110D is an application that is not graphics card assisted, image source 110E is a webcam, and image source 110F is a capture card. In some examples, API X may be a graphics API such as DIRECTX®, OPENGL®, VULKAN®, or another graphics API. It is noted that the image sources 110A-F shown in FIG. 1 are merely some examples of certain image sources that may be open and executing on a streamer device 100 and that the techniques described herein may also be employed for use with any other combinations of the same or different types of image capture sources. In some examples, each image capture source 110A-F may be displayed in a corresponding window or other graphical display interface on the streamer device 100.

As also shown in FIG. 1, a selection component 105 executes on the streamer device 100. As will be described in greater detail below, the selection component 105 may be a software component executing on the streamer device 100 that may determine open image sources 110A-F on the streamer device 100, receive an indication of a selected one of image sources 110A-F for streaming to other viewer devices 130A-C, automatically select a suitable image capture component for use with the selected image source, and employ the selected image capture component to capture image data from the selected image source for streaming to the viewer devices 103A-C. In the example of FIG. 1, the streamer transmits the streamed video content to the viewer devices 130A-C via a video streaming service 120. The video content may be transmitted from streamer device 100 to video streaming service 120 and, in turn, from video streaming service 120 to viewer devices 130A-C over one or more communications networks, for example one or more local area networks (LAN's) and/or one or more wide area networks (WAN's), such as the Internet. Additionally, video content may be transmitted from streamer device 100 to video streaming service 120 and, in turn, from video streaming service 120 to viewer devices 130A-C using streaming transmission techniques, in which portions of transmitted content are received and played while subsequent portions of the transmitted content are being transmitted. In some examples, the video content may be transmitted to viewers and played using live streaming techniques. For example, video content of an event (e.g., video game) may be transmitted to viewers, and at least part of the video content may be played while the event is still occurring (e.g., while the video game is still being played by the streamer), albeit with some small amounts latency between the time that video content is captured by the provider and the time that the video is eventually played to viewers.

Figure 2:
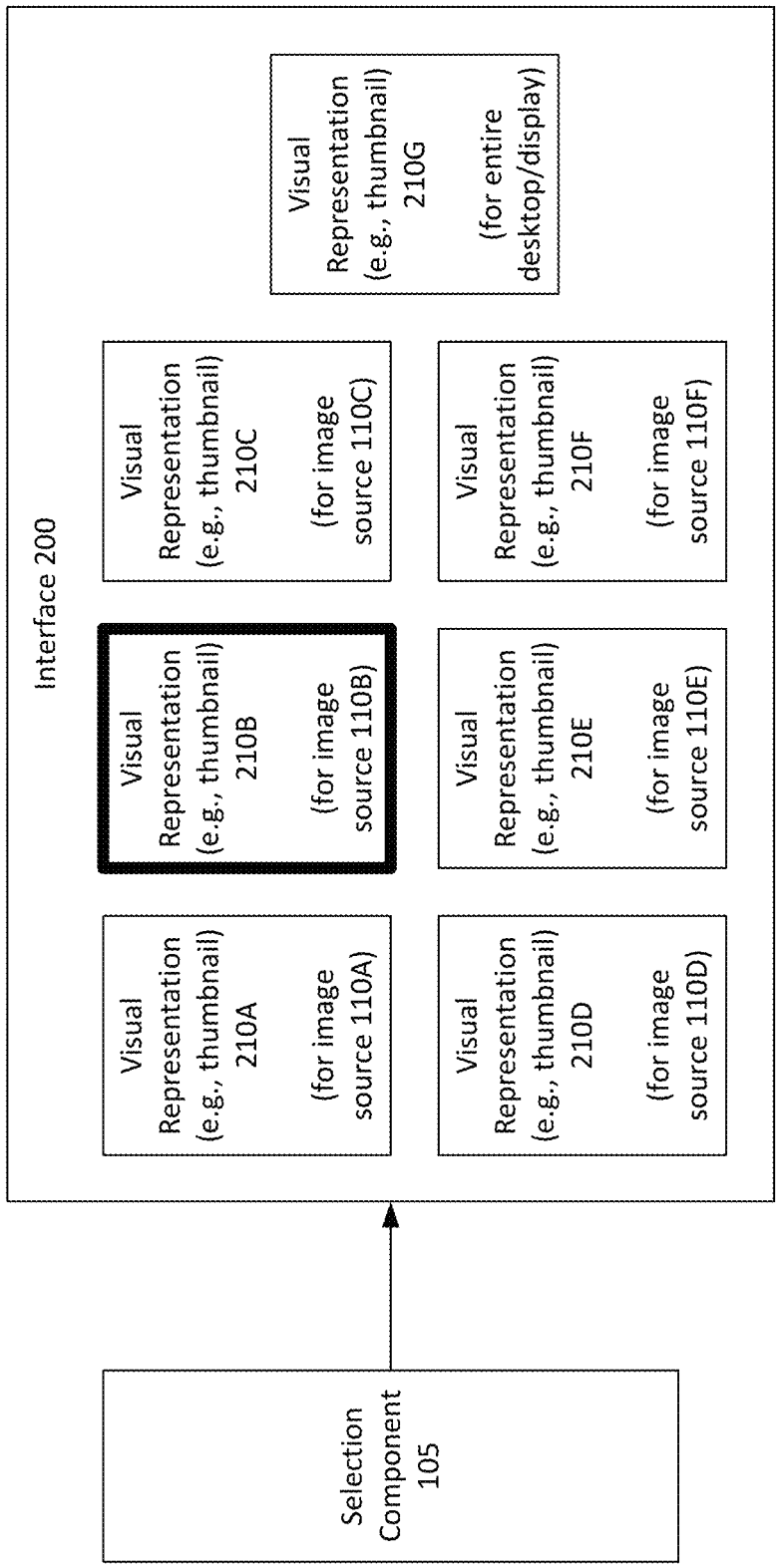
FIG. 2 is diagram illustrating an example image source selection interface that may be used in accordance with the present disclosure.

Referring now to FIG. 2, an example image source selection interface will now be described in detail. In particular, in some examples, a streamer may indicate to the selection component 105 that the streamer wishes to initiate a streaming session. In response, the selection component 105 may determine the image sources 110A-F that are currently open on the streamer's device. As described above, the image sources may include, for example, video games, other applications, cameras (e.g., webcams), capture cards, and the like. In some cases, the selection component 105 may request an indication of open applications on the streamer device 100 from an operating system executing on the streamer device 100. The selection component may then determine the open image sources based on the open applications. For example, the open image sources may include open applications that generate image data. Upon determining the open image sources, the selection component may display an interface 200 that includes visual representations 210A-F of the image sources 110A-F, respectively. In some examples, the visual representations 210A-F may include thumbnails, titles, icons, and/or other indications of the image sources 110A-F. In some examples, the use of thumbnails as visual representations 210A-F may be advantageous because they may provide an additional visual confirmation to the streamer of the contents of each image source 110A-F. In the example of FIG. 2, interface 200 also includes an additional visual representation 210G that represents an entire desktop and/or other display of the streamer device 100. Each of the visual representations 210A-G may be selectable by the streamer, such as by clicking on the visual representation 210A-G using an attached mouse, touchscreen, or other input device. In the example of FIG. 2, the streamer has selected visual representation 210B, as indicated by the thick black border surrounding visual representation 210B. This indicates to the selection component 105 that the streamer has selected the corresponding respective image source 110B for streaming to the viewer devices 130A-C.

Figure 3:
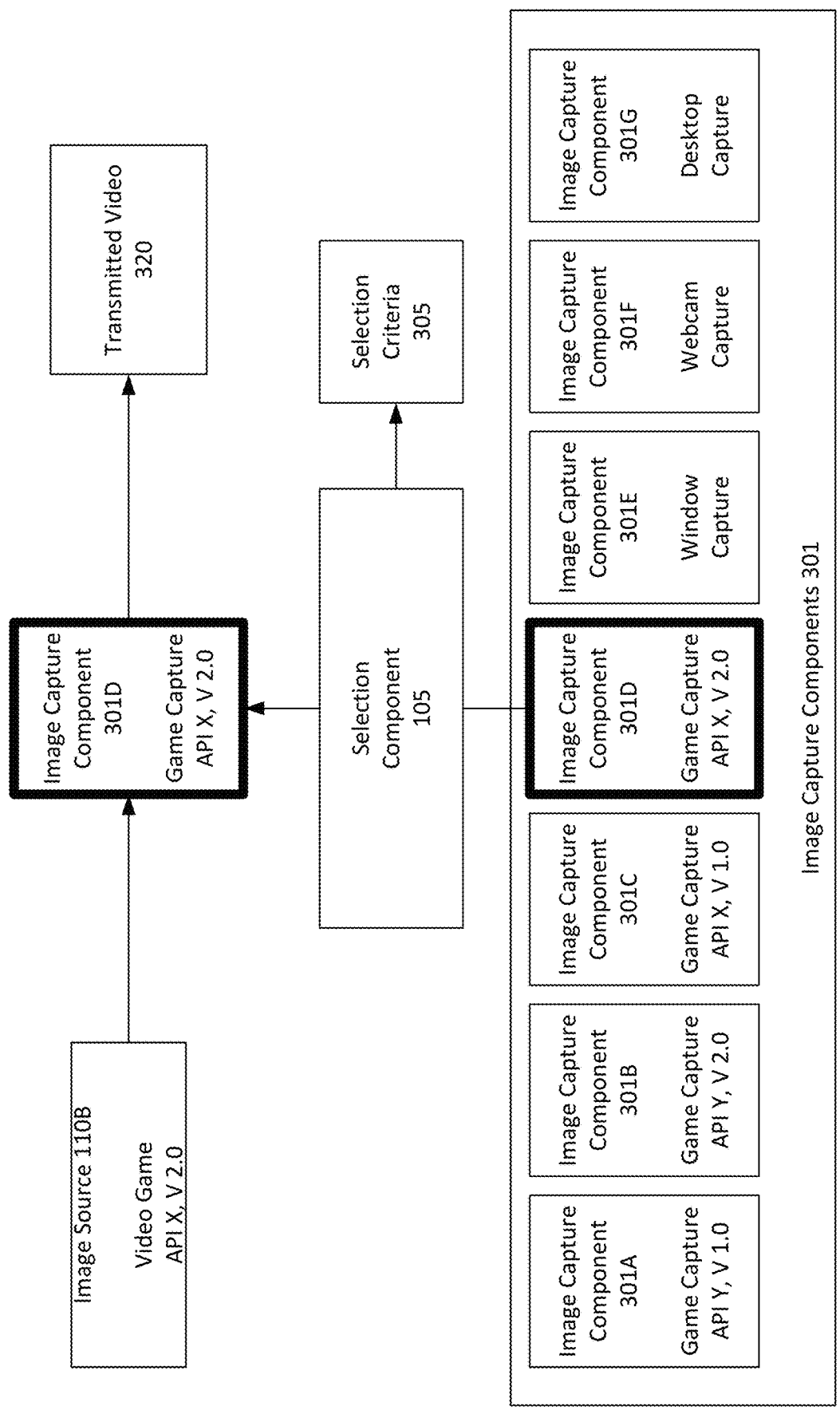
FIG. 3 is a diagram illustrating a first example image capture component selection that may be used in accordance with the present disclosure.

Upon receipt of a selected image source for streaming, which is image source 110B in the example of FIG. 2, the selection component 105 may automatically select a suitable image capture component for use with the selected image source. In particular, referring now to FIG. 3, it is shown that a group of image capture components 301A-G (collectively referred to as image capture components 301) are available to the streamer. In some examples, the image capture components 301 may include all image capture components that are installed on streamer device 100 and/or that are known or accessible to a video streaming service 120. In the particular example of FIG. 3, image capture component 301A is a game capture component corresponding to a particular graphics API (API Y, Version 1.0), image capture component 301B is another game capture component corresponding to another particular graphics API (API Y, Version 2.0), image capture component 301C is another game capture component corresponding to another particular graphics API (API X, Version 1.0), image capture component 301D is another game capture component corresponding to another particular graphics API (API X, Version 2.0), image capture component 301E is a window capture component, image capture component 301F is a webcam capture component, and image capture component 301E is a desktop capture component (e.g., for capturing an image of an entire desktop and/or other display). In some examples, API X could be a particular type of graphics API, such as DIRECTX®, while API Y could be another particular type of graphics API, such as OPENGL® or VULKAN®. It is noted that the image capture components 301A-G shown in FIG. 3 are merely some examples of certain image capture components that may available to the streamer, and that the techniques described herein may also be employed for use with any other combinations of the same or different image capture components. As shown in FIG. 3, the selection component 105 automatically selects image capture component 301D (a game capture component corresponding to API X, Version 2.0) for use with image source 110B (a video game that employs API X, Version 2.0). The selection component 105 may then employ image capture component 301D to capture image data (e.g., video) from the image source 110B for transmission to viewer devices 130A-V as transmitted video 320.

Figure 4:
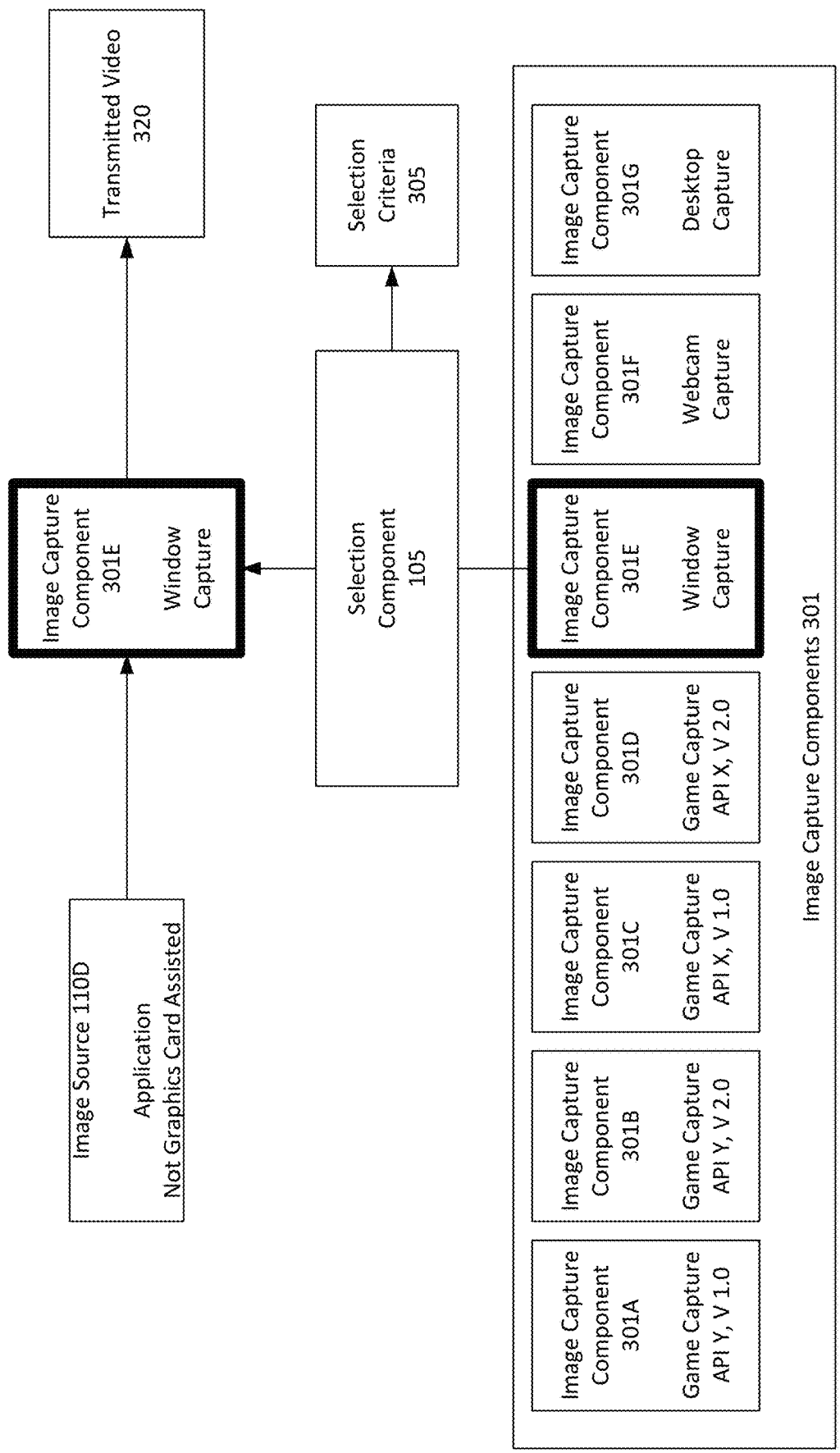
FIG. 4 is a diagram illustrating a second example image capture component selection that may be used in accordance with the present disclosure.

Referring now to FIG. 4, another example is shown in which the streamer has selected image source 110D (an application that is not graphics card assisted) as the selected application for streaming. For example, the streamer may select image source 110D by selecting the respective visual representation 210D from interface 200 of FIG. 2. Upon receipt of the selection of image source 110D, the selection component 105 may automatically select a suitable image capture component for use with the selected image source 110D. As shown in FIG. 4, the selection component 105 automatically selects image capture component 301E (a window capture component) for use with image source 110D (an application that is not graphics card assisted). The selection component 105 may then employ image capture component 301E to capture image data (e.g., video) from the image source 110D for transmission to viewer devices 130A-V as transmitted video 320.

As shown in both the examples of FIGS. 3 and 4, the selection component 105 may select suitable image capture components for use with the selected image sources based on a set of selection criteria 305. Referring now to FIG. 5, some examples of selection criteria 305 will now be described in detail. In some cases, the selection criteria 305 may include stored information that indicates a selected image capture component for use with the selected image source. In some examples, the selection criteria 305 (and/or stored information included therein) may be compiled, maintained, updated, and provided to the selection component 105 by a video streaming service 120 that the streamer employs to transmit the streamed image data to viewers. In some examples, the selection criteria 305 may specify and/or identify a particular image capture component that is suitable for a particular selected image source. In other examples, in addition or as an alternative to specifying a suitable image capture component, the selection criteria 305 may specify a set of guidelines or rules that may be employed to determine a suitable image capture component. Thus, selection criteria may be employed by any combination of the selection component 105, the video streaming service 120 and/or by other components, entities, or individuals. In the example of FIG. 5, the selection criteria 305 includes image source criteria 501, prior use criteria 502, and trial and error criteria 503. It is noted that this is merely a non-limiting example of selection criteria 305, and that the techniques described herein may employ any combinations of these and/or other criteria to select a suitable image capture component for a particular selected image source.

Image source criteria 501 includes criteria associated with characteristics of the selected image source. For example, image source criteria 501 may include criteria to determine a suitable image capture component based on an image source type (e.g., video game, webcam, capture card, non-gaming or other application, an entire screen display or desktop, etc.) of the selected image source. As another example, image source criteria 501 may include criteria to determine a suitable image capture component based on other factors, such as whether the image source is graphics card assisted, based on a particular type and/or version of a graphics API that is employed by the selected image source, and/or other characteristics of the selected image source. In some specific examples, if the selected image source is an entire screen display or desktop, then a desktop capture component (e.g., image capture component 301G of FIGS. 3 and 4) may be employed. Also, in some examples, if the image source is a webcam or capture card, then a webcam capture component (e.g., image capture component 301F of FIGS. 3 and 4) may be employed. For video games and other applications, determinations may sometimes be more complex. For example, while many video games may require game capture components, there are some video games that may require window capture components. Additionally, while many non-gaming applications may require window capture components, there are some non-gaming applications that may require game capture components. In some examples, if the selected image source is a video game or other application that is graphics card assisted, then a game capture component (e.g., one of image capture components 301A-D of FIGS. 3 and 4) may be employed, such as a game capture component that corresponds to a type and/or version of a graphics API used by the video game or other application. By contrast, in some examples, if the selected image source is an application that is not graphics card assisted, then a window capture component (e.g., image capture component 301E of FIGS. 3 and 4) may be employed. In some examples, indications of characteristics of a selected image source, such as an image source type, a corresponding graphics API type and/or version, an indication of whether the selected image source is graphics card assisted, and/or other characteristics, may be compiled and stored, for example by the video streaming service 120, as part of the image source criteria 501 and/or as part of other stored information that may be accessible to the selection component 105.

Prior use criteria 502 includes criteria associated with prior uses of one or more image capture components in combination with a selected image source. For example, prior use criteria 502 may include criteria to determine a suitable image capture component based on prior testing of image capture components (e.g., by video streaming service 120 or another party), prior use of an image capture component by the same streamer, prior use of an image capture component by other streamers, and/or other criteria. In some examples, prior use data that includes results of testing or other prior uses of image capture components may be compiled and stored, for example by the video streaming service 120, as part of the prior use criteria and/or as part of other stored information that may be accessible to the selection component 105.

In some examples, a video streaming service 120 may conduct tests to determine which image capture components are most suitable for use a particular image source. Also, in some cases, the video streaming service 120 may monitor prior attempts by the streamer to capture image data from the selected image source. If a prior attempt is successful, then the video streaming service 120 may store, in the prior-use data, an indication of the image capture component that was used in the successful attempt. In addition to prior image capture attempts by same streamer, the video streaming service 120 may also crowdsource its data, such as by monitoring prior image capture attempts made by other streamers to indicate which image capture components resulted in successful attempts. In some examples, the video streaming service 120 may employ various factors to determine whether a prior image capture attempt is successful. In particular, in some cases, an image capture attempt may be considered to be successful when a streamer initiates and operates a streaming session for at least a minimum threshold time duration. By contrast, if, after a short time duration (e.g., less than the minimum threshold time duration), the streamer terminates a streaming session with an initial image capture component and re-attempts streaming using a different type of image capture component, then this may be an indication that the initial image capture component was not successful or suitable for streaming of image data from that application.

In some examples, testing and/or other prior use data may be dynamically updated, such as by transmitting updated data to clients, maintaining a blacklist or other collection of updated data that may be dynamically fetched by (or otherwise made accessible to) clients, and/or via any combinations of these or other techniques. For example, in some cases, reports may be received that a particular game update and/or various in-game events may cause problems (e.g., crashes, glitches or other errors) when a particular image capture component is being used—and that use of an alternative image capture component may alleviate these problems. In some examples, this and other types of dynamically updated information may be periodically forwarded to streamer devices—and/or may be stored at a location from which it may be dynamically fetched by streamer devices. This may allow new or updated information to be conveyed to the selection component, for example without the need to install a new version of the selection component and/or to re-download existing selection criteria that has not changed.

Trial and error criteria 503 includes criteria to determine criteria to determine a suitable image capture component based on a trail and error technique. For example, in some cases, the selection component 105 may attempt the use of an initial image capture component to capture image data from the selected image source. The selection component may then make a determination as to whether this initial attempt is successful. In some examples, a texture of an image that is captured using the initial image capture component may be examined to determine whether the initial attempt is successful. Specifically, in some cases, if the captured image has no texture or an all-black texture, then this may indicate that the initial image capture component does not successfully capture the image data. By contrast, if the captured image has a valid texture that is not all black, then this may indicate that the initial image capture component successfully captures the image data and is suitable for use with the selected image source. If the initial image capture component is unsuitable (i.e., does not successfully capture the image data), then the selection component 105 may re-attempt the image capture with one or more different successive image capture components until a suitable image capture component that successfully captures the image data is detected. In some examples, if no suitable image capture component is identified for the selected image source (or if a threshold number of allowed attempts is exceeded), then, as a fallback, a desktop capture component may be employed to capture an image of the entire desktop of the streamer's device. The image of the entire desktop may then be cropped to include only the selected image source that the streamer wishes to capture and transmit.

In some examples, the image source criteria 501, prior use criteria 502, and trial and error criteria 503 may be employed in combination together. For example, in some cases, the selection component 105 may select an initial image capture component to attempt for use with a selected image source based on the image source criteria 501 and/or the prior use criteria 502. If this initially attempted image capture method is unsuccessful, then the trial and error criteria 503 may be employed, such as to attempt the use of additional image capture components. Moreover, the additional image capture components to attempt for use as part of the trial and error technique (and the order in which they are attempted) may also be determined based on the image source criteria 501 and/or the prior use criteria 502. In this manner, even when using a trail and error approach, the image capture components that are attempted may still be selected in an intelligent manner (e.g., based on characteristics of the image source and/or prior use or testing), for example as opposed to merely attempting image components that are selected at random.

It is further noted that, in some examples, the use of multiple different types of image capture components may be attempted in parallel (e.g., simultaneously or at least partially simultaneously with one another). In some cases, this may be particularly advantageous for scenarios in which certain types of image capture components (e.g., game capture components) require a longer startup period than other types of image capture components (e.g., window capture components). To illustrate this concept, consider a scenario in which use of a window capture component is attempted in parallel with use of a game capture component. Now suppose that the window capture component has a shorter startup time than the game capture component. In this scenario, the selection component may start the capture process by using the window capture component to initially provide the outgoing transmitted video (since it has a shorter startup time than the game capture component). When the game capture component eventually starts up (at a later time), the selection component may compare the qualities of images captured from the game capture component to images captured from the window capture component. If the game capture component provides better results, than the selection component may switch the outgoing transmitted video from the window capture component to the game capture component (and potentially terminate use of the window capture component). By contrast, if the window capture component provides better results, than the selection component may simply allow the window capture component to continue to provide the outgoing transmitted video (and potentially terminate use of the game capture component).

Figure 6:
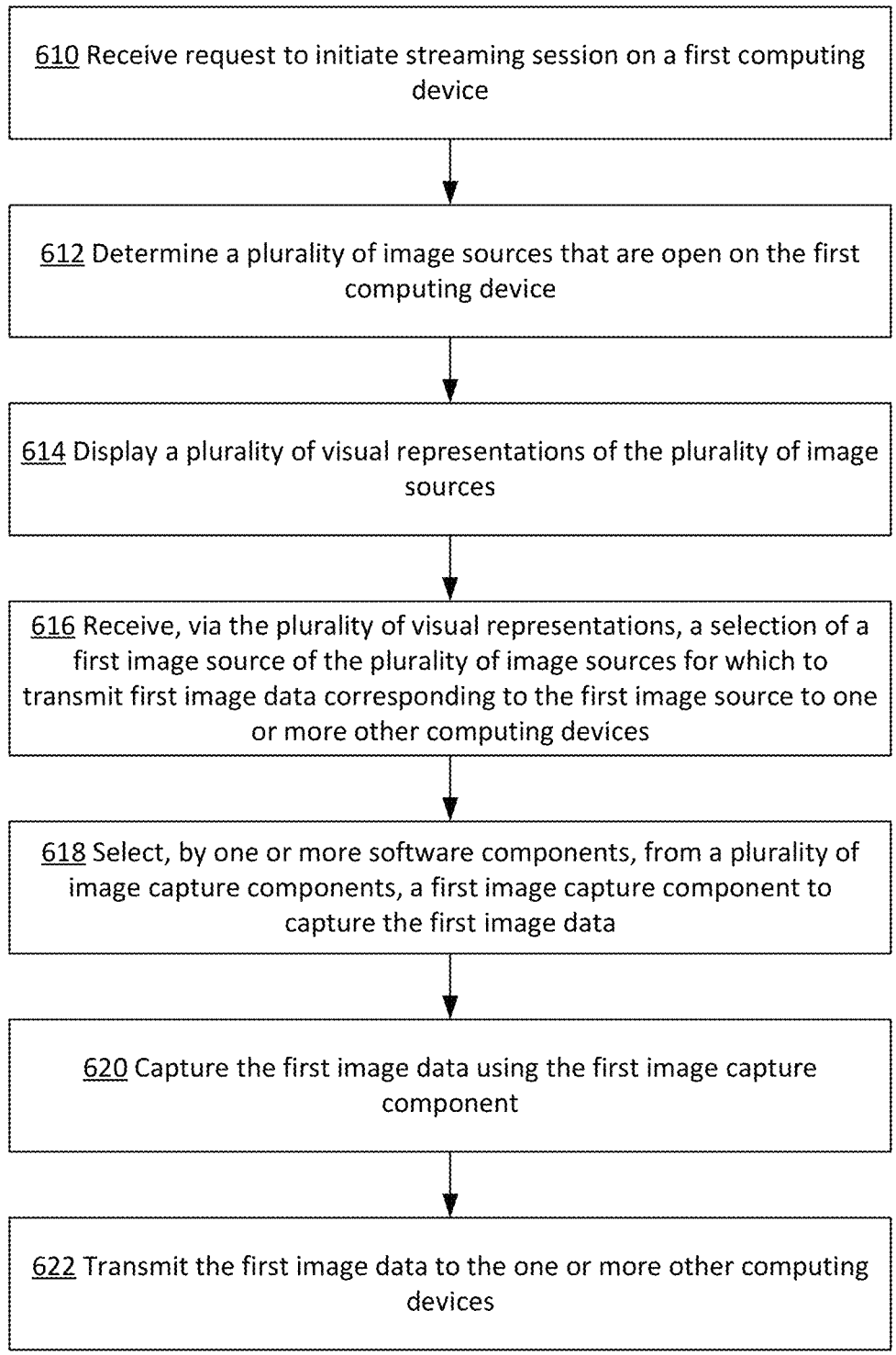
FIG. 6 is a flowchart illustrating an example process for image capture component selection that may be used in accordance with the present disclosure.

Referring now to FIG. 6, an example process for image capture component selection will now be described in detail. As shown, the process of FIG. 6 is initiated at operation 610, at which a request is received to initiate a streaming session on a first computing device. For example, a streamer may indicate to a selection component 105 executing on the first computing device that the streamer wishes to initiate a streaming session on the first computing device, such as by selecting a menu option or other control to initiate a streaming session, for example that may be displayed in a user interface provided by the selection component 105. At operation 612, a plurality of image sources that are open on the first computing device may be determined. For example, in some cases, the selection component 105 may request an indication of open applications on the first computing device from an operating system executing on the first computing device. The selection component 105 may then determine the open image sources based on the open applications. For example, the open image sources may include open applications that generate image data. As described above, the image sources may include, for example, video games, other applications, cameras (e.g., webcams), capture cards, and the like.

At operation 614, a plurality of visual representations of the plurality of image sources are displayed. For example, the plurality of visual representations may include thumbnails, titles, icons, and/or other indications of the plurality of image sources. The plurality of visual representations may be displayed in a user interface of the selection component 105, such as interface 200 of FIG. 2. At operation 616, a selection of a first image source of the plurality of image sources for which to transmit first image data corresponding to the first image source to one or more other computing devices is received via the plurality of visual representations. For example, each of the visual representations may be selectable by the streamer, such as by clicking on the visual representation using an attached mouse, touchscreen, or other input device.

At operation 618, a first image capture component to capture the first image data is selected, by one or more software components, from a plurality of image capture components. For example, upon receipt of a first image source for streaming, the selection component may automatically select a suitable image capture component for use with the first image source. In some examples, the selection component may employ a variety of selection criteria in order to make this determination. For example, in some cases, the selection component may access stored information that indicates the first image capture component for use with the first image source. In some examples, this stored information may be compiled, maintained, updated, and provided to the selection component by a video streaming service that the streamer employs to transmit the streamed image data to viewers. In some examples, the first image capture component may be determined based, at least in part, on characteristics of the first image source. For example, the first image capture component may be determined based, at least in part, on whether the first image source is generated by a video game, a webcam, a capture card, or by another type of application. The first image capture component may be also be determined based on other factors, such as a particular type and/or version of graphics API's that are employed by the first image source. The first image capture component may also be determined based on other characteristics, such as whether the first image source is assisted by a graphics card and/or other factors. In one specific example, the first image capture component may be selected based, at least in part, on whether the first image source is generated by a video game, on one or more application programming interfaces employed by the first image source, or on whether the first image source is assisted by a graphics card In some examples, the first image capture component may be selected based on one or more prior uses of the first image capture component (and/or other image capture components) to capture other image data from the first image source. The one or more prior uses of the first image capture component to capture the other image data may be performed by at least one of a same user (e.g., streamer) that operates the first computing device, by one or more other users that provide the other image data to a streaming service, or by representatives of the streaming service that test the plurality of image capture components. For example, in some cases, a video streaming service may conduct tests to determine which image capture components are most suitable for use with a particular image source. Also, in some cases, the video streaming service may monitor prior attempts by the streamer to capture image data from the first image source. If a prior attempt is successful, then the video streaming service may store, in prior-use data, an indication of the image capture component that was used in the successful attempt. In addition to prior image capture attempts by same streamer, the video streaming service may also crowdsource its data, such as by monitoring prior image capture attempts made by other streamers to indicate which image capture components resulted in successful attempts. In some examples, the video streaming service may employ various factors to determine whether a prior image capture attempt is successful. For example, a success of the one or more prior uses may be determined based on the first image capture component being employed to capture the other image data for at least a threshold minimum time duration. In particular, in some cases, an image capture attempt may be considered to be successful when a streamer initiates and operates a streaming session for at least the minimum threshold time duration. By contrast, if, after a short time duration (e.g., less than the minimum threshold time duration), the streamer terminates a streaming session with an initial image capture component and re-attempts streaming using a different type of image capture component, then this may be an indication that the initial image capture component was not successful or suitable for streaming of image data from that application.

In some examples, the selection component may employ a trial and error process to select the first image capture component for use with the first image source. For example, in some cases, the selection component may first attempt the use of a second image capture component to capture the first image data from the first image source. It may then be determined that the second image capture component does not successfully capture the first image data. The selection component may then attempt the use of the first image capture component to capture the first image data. It may then be determined that the first image capture component does successfully capture the first image data. In some examples, a texture of an image that is captured using the initial (e.g., second) image capture component may be examined to determine that the initial attempt is successful. Specifically, in some cases, determining that the initial (e.g., second) image capture component does not successfully capture the first image may include determining that an image obtained by the initial (e.g., second) image capture component has no texture or an all-black texture. By contrast, if an image captured using the first image capture component has a valid texture that is not all black, then this may indicate that the first image capture component successfully captures the first image data and is suitable for use with the first image source. As described above, in some examples, if an initial image capture component is unsuitable (i.e., does not successfully capture the image data), then the selection component may re-attempt the image capture with one or more different successive image capture components until a suitable image capture component that successfully captures the image data is detected. In some examples, if no suitable image capture component is identified for the first image source (or if a threshold number of allowed attempts is exceeded), then, as a fallback, a desktop capture component may be selected as the first image capture component, and the desktop capture component may capture an image of an entire desktop or display screen of the first computing device. The image of the entire desktop may then be cropped after being captured to show only the first image source that the streamer wishes to capture and transmit.

At operation 620, the first image data from the first image source is captured using the first image capture component selected at operation 618. For example, a window or other user interface of the first image source may be configured to provide image data to the first image capture component and/or the first image capture component may be configured to obtain image data that is output by a window or other user interface of the first image source. At operation 622, the first image data may be transmitted to the one or more other computing devices, such as by transmitting the first image data over one or more communications networks, using an appropriate protocol, and optionally encoding, compressing or otherwise formatting the image data for transmission.

It is noted that, while some of the above examples may refer to scenarios in which the streamer selects only a single image source for streaming, the techniques described herein may also be employed in scenarios in which the streamer selects multiple image sources from which to concurrently stream video or other image data. For example, the streamer may concurrently stream video from multiple games or other applications, may concurrently stream video from a game and a webcam, or concurrently stream video from any other combinations of multiple image sources. In some examples, a selection component user interface, such as interface 200 of FIG. 2, may allow the user to select multiple image sources for concurrent streaming, such as by selecting multiple thumbnails or other visual representations from the user interface. The techniques described herein may then be performed to automatically select a suitable image capture component for each of the multiple selected image sources. In some examples, when multiple image sources are selected, the selection component and/or other software or components may allow the streamer to configure and adjust a size, arrangement, layout and/or other characteristics for concurrently displaying video or other image data from the multiple selected image sources in the streamed image output from the streamer's device. In such examples, the user can save the resulting layout for future use.

Figure 7:
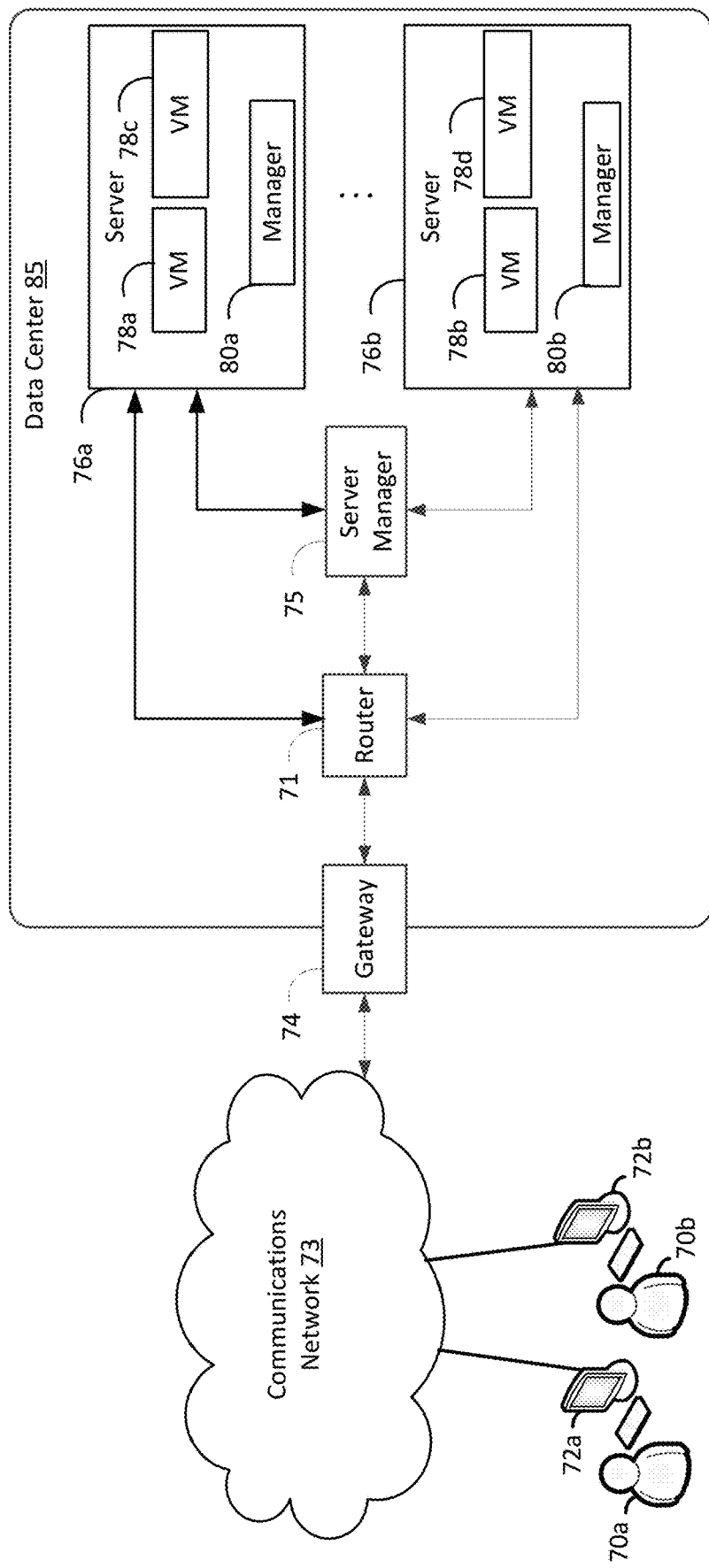
FIG. 7 is a diagram illustrating an example system for transmitting and providing data that may be used in accordance with the present disclosure.

An example system for transmitting and providing data will now be described in detail. In particular, FIG. 7 illustrates an example computing environment in which the embodiments described herein may be implemented. FIG. 7 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76*a* and 76*b* (which may be referred herein singularly as server 76 or in the plural as servers 76) that provide computing resources. These resources may be available as bare metal resources or as virtual machine instances 78*a-d* (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 8:
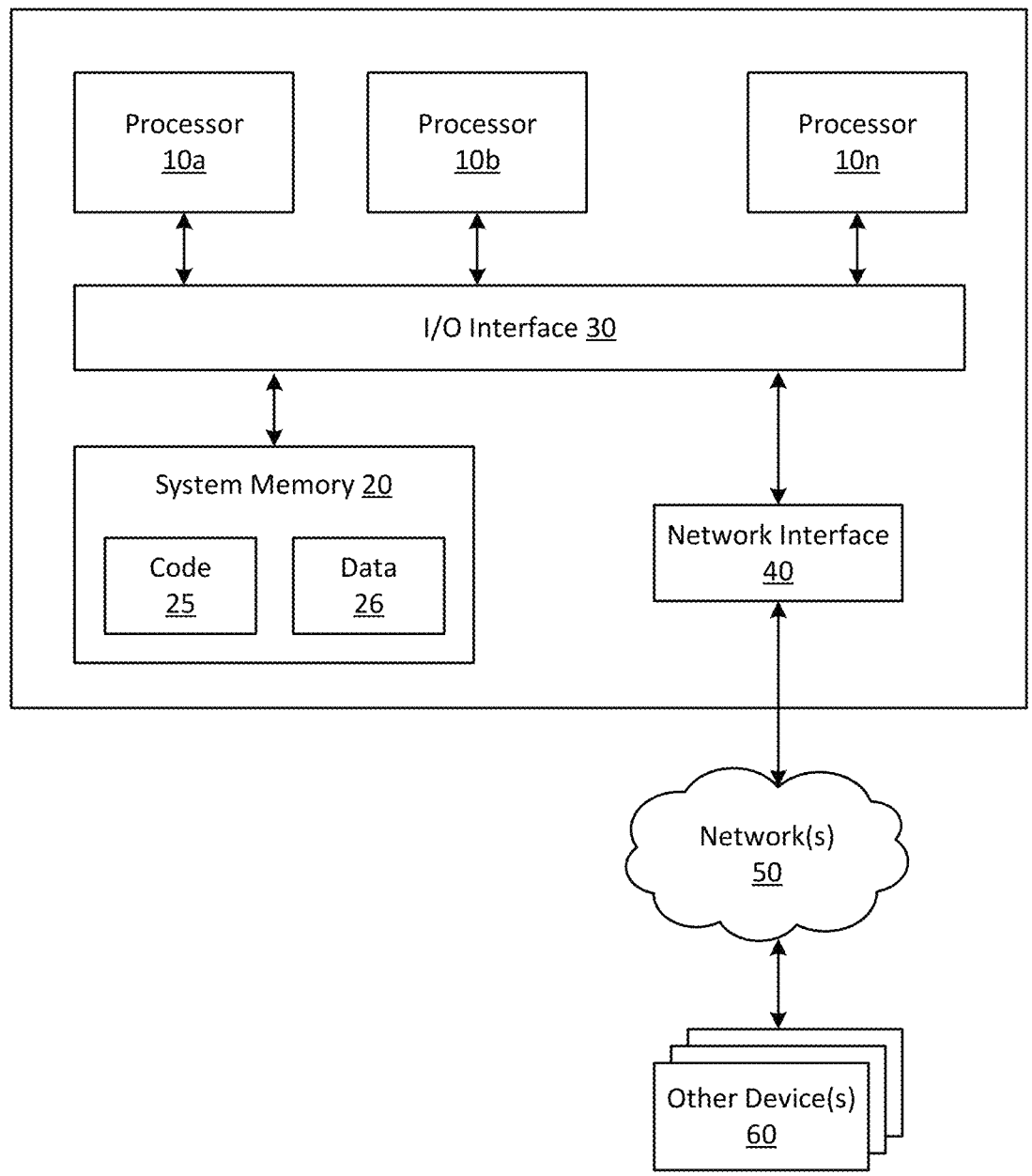
FIG. 8 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
   one or more processors; and
   one or more memories having stored therein computing instructions that, upon execution by the one or more processors, cause the computing system to perform operations comprising:
      determining a plurality of image sources that are open on a first computing device;
      displaying a plurality of visual representations of the plurality of image sources;
      receiving, via the plurality of visual representations, a selection of a first image source of the plurality of image sources for which to transmit first image data corresponding to the first image source to one or more other computing devices;
      automatically selecting, by one or more software components, from a plurality of image capture components, a first image capture component that captures, by at least causing a presentation entry-point in a graphics application programming interface to be replaced with a replacement function, the first image data corresponding to the first image source, wherein the first image capture component is selected based, at least in part, on a determination that a streaming session was operated with the first image capture component capturing other image data from the first image source for at least a threshold minimum time duration; and
      capturing the first image data using the first image capture component, wherein the first image data is transmitted to the one or more other computing devices.

2. The computing system of claim 1, wherein the plurality of visual representations of the plurality of image sources comprise thumbnails of the plurality of image sources.

3. A computer-implemented method comprising:
   determining a plurality of image sources that are open on a first computing device;
   displaying a plurality of visual representations of the plurality of image sources;
   receiving, via the plurality of visual representations, a selection of a first image source of the plurality of image sources for which to transmit first image data corresponding to the first image source to one or more other computing devices;
   automatically selecting, by one or more software components, from a plurality of image capture components, a first image capture component that captures, by at least causing a presentation entry-point in a graphics application programming interface to be replaced with a replacement function, the first image data corresponding to the first image source, wherein the first image capture component is selected based, at least in part, on a determination that a streaming session was operated with the first image capture component capturing other image data from the first image source for at least a threshold minimum time duration; and
   capturing the first image data using the first image capture component, wherein the first image data is transmitted to the one or more other computing devices.

4. The computer-implemented method of claim 3, wherein the plurality of visual representations of the plurality of image sources comprise thumbnails of the plurality of image sources.

5. The computer-implemented method of claim 3, wherein the first image capture component is further selected based, in part, on whether the first image source is generated by a video game or on whether the first image source is assisted by a graphics card.

6. The computer-implemented method of claim 3, wherein the selecting comprises:
   attempting use of a second image capture component to capture the first image data;
   determining that the second image capture component does not successfully capture the first image data;
   attempting use of the first image capture component to capture the first image data; and
   determining that the first image capture component does successfully capture the first image data.

7. The computer-implemented method of claim 6, wherein the use of the first image capture component and the use of the second image capture component are attempted in parallel with one another.

8. The computer-implemented method of claim 6, wherein determining that the second image capture component does not successfully capture the first image data comprises determining that the second image capture component obtains an image with no texture or with an all-black texture.

9. The computer-implemented method of claim 3, wherein the first image capture component comprises a component that captures an image of an entire desktop, and wherein the image of the entire desktop is cropped after being captured to show only the first image source.

10. One or more non-transitory computer-readable storage media having stored thereon computing instructions that, upon execution by a computing device, cause the computing device to perform operations comprising:
    determining a plurality of image sources that are open on a first computing device;
    displaying a plurality of visual representations of the plurality of image sources;
    receiving, via the plurality of visual representations, a selection of a first image source of the plurality of image sources for which to transmit first image data corresponding to the first image source to one or more other computing devices;
    automatically selecting, by one or more software components, from a plurality of image capture components, a first image capture component that captures, by at least causing a presentation entry-point in a graphics application programming interface to be replaced with a replacement function, the first image data corresponding to the first image source, wherein the first image capture component is selected based, at least in part, on a determination that a streaming session was operated with the first image capture component capturing other image data from the first image source for at least a threshold minimum time duration; and
    capturing the first image data using the first image capture component, wherein the first image data is transmitted to the one or more other computing devices.

11. The one or more non-transitory computer-readable storage media of claim 10, wherein the first image capture component is further selected based, in part, on whether the first image source is generated by a video game or on whether the first image source is assisted by a graphics card.

12. The one or more non-transitory computer-readable storage media of claim 10, wherein the selecting comprises:
   attempting use of a second image capture component to capture the first image data;
   determining that the second image capture component does not successfully capture the first image data;
   attempting use of the first image capture component to capture the first image data; and
   determining that the first image capture component does successfully capture the first image data.

13. The computing system of claim 1, wherein the first image capture component is further selected based, in part, on a type of the graphics application programming interface employed by the first image source.

14. The computer-implemented method of claim 3, wherein the first image capture component is further selected based, in part, on a type of the graphics application programming interface employed by the first image source.

15. The one or more non-transitory computer-readable storage media of claim 10, wherein the first image capture component is further selected based, in part, on a type of the graphics application programming interface employed by the first image source.

* * * * *